E. L. DUNBAR.
Faucet Attachments.
No. 141,040.  Patented July 22, 1873.
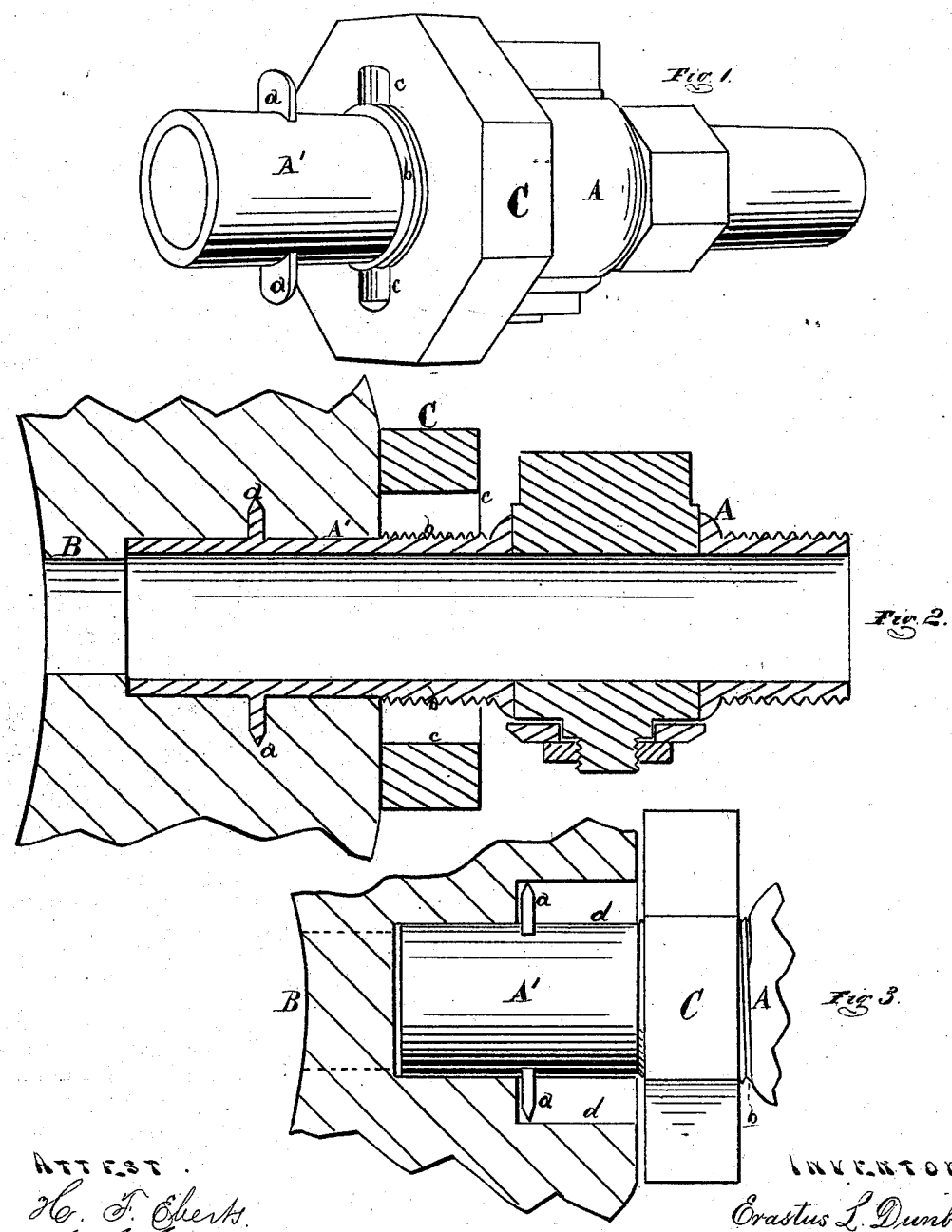
ATTEST.
H. F. Eberts
N. S. Sprague
INVENTOR.
Erastus L. Dunbar
per attorney
Thos S Sprague

UNITED STATES PATENT OFFICE.

ERASTUS L. DUNBAR, OF BAY CITY, MICHIGAN.

IMPROVEMENT IN FAUCET ATTACHMENTS.

Specification forming part of Letters Patent No. 141,040, dated July 22, 1873; application filed May 17, 1873.

*To all whom it may concern:*

Be it known that I, ERASTUS L. DUNBAR, of Bay City, in the county of Bay and State of Michigan, have invented a new and useful Improvement in Stop-Cock for Connecting Wooden Mains with Service-Pipes; and I do declare that the following is a true and accurate description thereof, reference being had to the accompanying drawings and to the letters of reference marked thereon and being a part of this specification, in which—

Figure 1 is a perspective view. Fig. 2 is a longitudinal section. Fig. 3 is a horizontal section of the coupling as when inserted in a wooden main.

Like letters refer to like parts in the several figures.

This invention relates to an improved stop-cock designed for connecting metallic service-pipe with wooden mains, used for conveying gas or water, and known as "corporation-stops;" its object being, first, to so construct and apply the cock-barrel that it cannot be pulled away from the main, and, secondly, to make a tight connection. The invention consists in providing the tube behind the plug with a pair of knife-studs, which enter the wood by rotating the tube a quarter-turn on its axis after inserting it in the hole bored for it; and in providing the tube with a jam-nut which may be screwed back against the main to prevent leakage, the device being applied in the manner more fully hereinafter set forth.

In the drawing, A represents the shell of an ordinary stop-cock, threaded at the front end to receive the coupling of a service-pipe. At the rear end a tube, A', is cast in one piece therewith for insertion in the wooden main B, a portion of which is shown in Fig. 3. *a a* are two knife-edged studs cast on the tube transversely to its axis, the one at the top and the other at the bottom of the tube. Behind the shell A the tube is enlarged in diameter, and on this enlarged part is cut a screw-thread, as at *b*, Fig. 2, to receive a jam-nut, C, which has two slots, *c*, cut in it to allow it to be slipped over the studs *a*. By enlarging the part *b* to the diameter as measured from the point of one stud *a* to that of the other, and the nut correspondingly, the latter need not be slotted, but this involves a needless waste of metal.

The manner of connecting a service-pipe with the wooden main is as follows: A hole of the external diameter of the tube is bored in the side of the main deep enough to allow the latter tube to be inserted as far as the shoulder of the part *b*, but is not bored through the main. With a gouge or chisel two gains, *d*, are cut in the sides of the hole on a horizontal plane far enough or deep enough to allow the cock to be inserted, its plug lying horizontally. The cock is now rotated a quarter-turn to bring the plug to a vertical position, which embeds the studs in the wood, and thus effectually prevents the tube from being drawn out of the hole. The jam-nut is now screwed home against the exterior of the main to prevent leakage. Any suitable gasket or packing may be interposed between the nut and the main, if desired. The hole is now bored through the wall of the main by a smaller bit inserted through the cock and tube, and the service-pipe connected with the cock by the coupling union.

What I claim as my invention, and desire to secure by Letters Patent, is—

1. The stop-cock A having its tube A' provided with the studs *a a*, substantially as and for the purpose set forth.

2. The combination, with the tube A' of the stop-cock, provided with the studs *a a*, of the jam-nut, substantially in the manner and for the purpose set forth.

ERASTUS L. DUNBAR.

Witnesses:
ANDREW WALTON,
WILLIAM MERCER.